United States Patent [19]
Matsushima et al.

[11] Patent Number: 5,691,511
[45] Date of Patent: Nov. 25, 1997

[54] CORDLESS DIGITIZER

[75] Inventors: Keiichi Matsushima; Shuuji Hirano, both of Kanagawa, Japan

[73] Assignee: Graphtec Corporation, Kanagawa, Japan

[21] Appl. No.: 328,523

[22] Filed: Oct. 25, 1994

[30] Foreign Application Priority Data

Oct. 29, 1993 [JP] Japan .................................. 5-325722

[51] Int. Cl.$^6$ .................................................. G08C 21/60
[52] U.S. Cl. ............................................................ 178/19
[58] Field of Search ...................... 178/18, 19; 245/156, 245/173, 179

[56] References Cited

U.S. PATENT DOCUMENTS

| | | | |
|---|---|---|---|
| 4,795,858 | 1/1989 | Yamazaki | 178/17 |
| 4,902,858 | 2/1990 | Yamanami et al. | |
| 5,051,545 | 9/1991 | McDesmott | 178/19 |
| 5,120,907 | 6/1992 | Shinisori et al. | 178/19 X |
| 5,313,024 | 5/1994 | Morton | 178/19 |
| 5,414,226 | 5/1995 | Matsushima | |

*Primary Examiner*—Curtis Kuntz
*Assistant Examiner*—Paul Loomis
*Attorney, Agent, or Firm*—Oliff & Berridge

[57] ABSTRACT

A cordless digitizer includes a tablet including position detecting elements formed of loop coils, error compensating elements formed of loop coils, and an auxiliary element formed of a coil which is arranged around a reading range of the tablet; and a position indicator including a position indicating element; and an error compensating unit which, when the position indicator is set at a position on the tablet, obtains first outputs according to interactions between the position detecting elements and the auxiliary element of the tablet and the position indicating element of the position indicator, and second outputs according to interactions between the error compensating elements, the auxiliary element of the tablet and the position indicating element of the position indicator to produce third outputs according to the first and second outputs from which error output components due to direct actions between the elements of the tablet have been eliminated; a position detecting loop coil assembly provided on the tablet which comprises loop coils arranged thereon at predetermined intervals in such a manner that adjacent loop coils are set close to one another but not overlapped with one another; and a loop coil selecting unit for selecting, from among the loop coils, a predetermined loop coil as a position detecting element, and a loop coil adjacent to the predetermined loop coil as an error compensating element.

7 Claims, 12 Drawing Sheets

① : SX1 , SX3a=ON
② : SX2 , SX4a=ON
③ : SX3b, SX5a=ON
④ : SX4b, SX6a=ON
⑤ : SX5b, SX7a=ON

① : SY1 , SY3a=ON
② : SY2 , SY4a=ON
③ : SY3b, SY5a=ON
④ : SY4b, SY6a=ON

CORDLESS DIGITIZER

BACKGROUND OF THE INVENTION

1. Field of the Invention

This invention relates to a cordless digitizer of the type that from among a number of conductors arranged on a tablet, a desired pair of conductors (first and second oscillating elements) are selected, and connected through a third oscillating element, and those oscillating elements and a position indicator having a fourth oscillating element form an oscillating system.

2. Description of the Related Art

An example of a cordless digitizer of this type has been proposed by the present Applicants.

In the cordless digitizer, conductors are arranged on the tablet in the direction of X-axis (hereinafter referred to as "X-direction loop coils") (each being selected as a first oscillating element), and conductors in the direction of Y-axis (hereinafter referred to as "Y-direction loop coils") (each being selected as a second oscillating element).

The X-direction loop coils are connected to the input side of an amplifier (a third oscillating element) one by one by means of an X-axis scanner, while the Y-direction loop coils are also connected to the output side of the amplifier one by one by means of a Y-axis scanner.

It is assumed that a position indicator is positioned on the tablet. When the X-direction loop coil (the first oscillating element) and the Y-direction loop coil (the second oscillating element) which are adjacent to the coil (the fourth oscillating element) of the position indicator are connected to the input side and output side of the amplifier (the third oscillating element) with the aid of the X-axis scanner and the Y-axis scanner, respectively, for instance in response to noises such as radio waves or the like an oscillating system is formed by the coil (the fourth oscillating element) of the position indicator, the amplifier (the third oscillating element), and the X-axis loop coil (the first oscillating element) and Y-axis loop coil (the second oscillating element) which are connected to the amplifier. The oscillating system thus formed oscillates at its natural frequency. When the oscillating system oscillates in this manner, the output of the amplifier (the third oscillating element) is applied to a utilizing circuit for determination of the position.

The X-direction loop coils and the Y-direction loop coils are successively selected with the X-axis scanner and the Y-axis scanner, respectively, to form oscillating systems, and the outputs of the amplifier are measured and stored for all of the oscillating systems thus formed. That is, for each of the oscillating systems, the positions of the X-direction loop coil and the Y-direction loop coil and the oscillation output are stored. As a result, an output distribution corresponding to the positions of the X-direction loop coils and the Y-direction loop coils is obtained.

The utilizing circuit determines the position indicated by the position indicator in the X-direction and in the Y-direction by calculating it according to the output distribution thus obtained.

In the above-described conventional cordless digitizer, the first and second oscillating elements are selected from among the plurality of conductors arranged on the tablet. Therefore, although the conductors on the tablet may be decreased in number, it is necessary to successively form a number of oscillating systems by selecting the oscillating elements one after another in the X-direction and in the Y-direction. In each of the oscillating systems, the oscillation will become stable in a short time; however, the measurement cannot be started immediately; that is, it is necessary to provide a waiting time before the start of the measurement. Hence, in the case where the measurement is carried out for a number of oscillating systems, those waiting times are accumulated, thus increasing the measurement period.

SUMMARY OF THE INVENTION

Accordingly, an object of this invention is to eliminate the above-described difficulty accompanying a conventional cordless digitizer.

Another object of the invention is to provide a cordless digitizer in which the oscillating systems required for the measurement are minimized in number so that the measurement time is reduced.

Still another object of the invention is to provide a cordless digitizer in which the occurrence of unwanted oscillations is prevented when the position indicator is not on the tablet.

Still another object of the invention is to provide a cordless digitizer in which the unwanted induction component is effectively eliminated with the resolution maintained unchanged.

The foregoing object of the invention has been achieved by the provision of a cordless digitizer in which first and second oscillating elements provided on a tablet are coupled through a third oscillating elements to each other, and the first, second and third oscillating elements and a fourth oscillating element provided in a position indicator form oscillating systems, and output signals of the oscillating systems are utilized to detect a position on the tablet which is indicated by the position indicator; in which the first oscillating element is a conductor loop arranged in the periphery of the tablet, the second oscillating elements are a plurality of conductor loops which are arranged in connection with positions on the tablet so as to be selected one by one; when an oscillating system formed by the first oscillating element, selected second oscillating element, third oscillating element, and fourth oscillating element is in oscillating state, an output signal of the oscillating system is utilized to detect a position on the tablet which is indicated by the position indicator.

In the cordless digitizer, one conductor loop is formed, as the first oscillating element, in the periphery of the tablet, and a plurality of loop coils are arranged, as the second oscillating elements, in connection with positions on the tablet in the direction of X-axis. The first and second oscillating elements are coupled through the third oscillating element to each other.

The position indicator has the fourth oscillating element. When the position indicator is positioned on the tablet, the first through fourth oscillating elements form an oscillating system, which provides a stable oscillation output. The oscillation output of the oscillating system is utilized to determine the position indicated by the position indicator in the direction of X-axis.

In addition, a plurality of loop coils are arranged in connection with positions on the tablet in the direction of Y-axis. When the above-described oscillating system is formed, the voltages induced in the Y-direction loop coils are measured to determine the position indicated by the position indicator in the direction of Y-axis.

Hence, in the cordless digitizer, the oscillating systems are equal in number to the X-direction loop coils, which eliminates the accumulation of the waiting times to a large value.

Also, the foregoing object of the invention has been achieved by the provision of a cordless digitizer comprising a first oscillating element which is a conductor loop arranged in the periphery of a tablet, second oscillating elements which are a plurality of conductor loops that are arranged on the tablet in connection with positions on the tablet and can be selected individually, a third oscillating element which is coupled to the second oscillating elements, a fourth oscillating element provided by a position indicator, in which a selected one of the second oscillating elements and an oscillation preventing conductor which is provided on the tablet to prevent the formation of the oscillating systems are connected to the input side of an amplifier forming the third oscillating element.

When the first and second oscillating elements are excited, for instance, by noises such as radio waves, the oscillation preventing conductor is also excited, and their outputs (or induction voltages due to the excitation) are applied to the amplifier forming the third oscillating element. When the position indicator is on the tablet, the first through fourth oscillating elements form an oscillating system. The output of the oscillating system thus formed is greater than the output of the oscillation preventing conductor, and therefore the oscillating system is placed in oscillating state. When the position indicator is not on the tablet, the outputs of the second oscillating element and of the oscillation preventing conductor, which are applied to the amplifier forming the third oscillating element, are canceled out by each other. As a result, the amplifier provides no output; that is, no oscillating system is formed.

Further, the foregoing object of the invention has been achieved by the provision of a cordless digitizer comprising: a tablet having position detecting elements which are loop coils, error compensating elements which are loop coils, and an auxiliary element which is a coil arranged around the reading range of the tablet; and a position indicator including a position indicating element; and error compensating means which, when the position indicator is set at a position on the tablet, obtains first outputs based on interactions between the position detecting elements, the auxiliary element of the tablet and the position indicating element of the position indicator, and second outputs based on interactions between the error compensating elements, the auxiliary element of the tablet and the position indicating element of the position indicator, and produces third outputs according to the first and second outputs from which error output components due to direct actions between the elements of the tablet have been eliminated, which cordless digitizer, according to the invention, is improved as follows: a position detecting loop coil assembly is provided on the tablet which comprises loop coils arranged thereon at predetermined intervals in such a manner that adjacent loop coils are set closed to one another but not overlapped with one another and are set closed to one another, and loop coil selecting means is provided which, from among the loop coils, selects a predetermined loop coil as a position detecting element, and a loop coil adjacent to the predetermined loop coil as an error compensating element.

In the cordless digitizer, the tablet has a plurality of loop coil assemblies different in the pitch of arrangement, and is provided with means for activating the loop coils in each of the plurality of loop coil assemblies in a time-division code.

In the cordless digitizer, when a loop coil is selected as the position detecting element, another loop coil adjacent to it is selected as the error compensating element, which effectively eliminates the error output components due to the direct actions between the elements on the tablet.

Furthermore, since the position detecting element is not lapped over the error compensating element, the action of the position indicating element can be effectively detected. Moreover, a loop coil is employed selectively as the position detecting element or the error compensating element, and the plurality of loop coil assemblies different in the pitch of arrangement are driven in a time-division mode. This means that the loop coils are effectively and economically utilized, and the position detection is achieved with high resolution.

The above and other objects and features of the present invention will be more apparent from the following description taken in conjunction with the accompanying drawings.

DETAILED DESCRIPTION OF THE PREFERRED EMBODIMENTS

This invention will be described with reference to the accompanying drawings.

Figure 1:
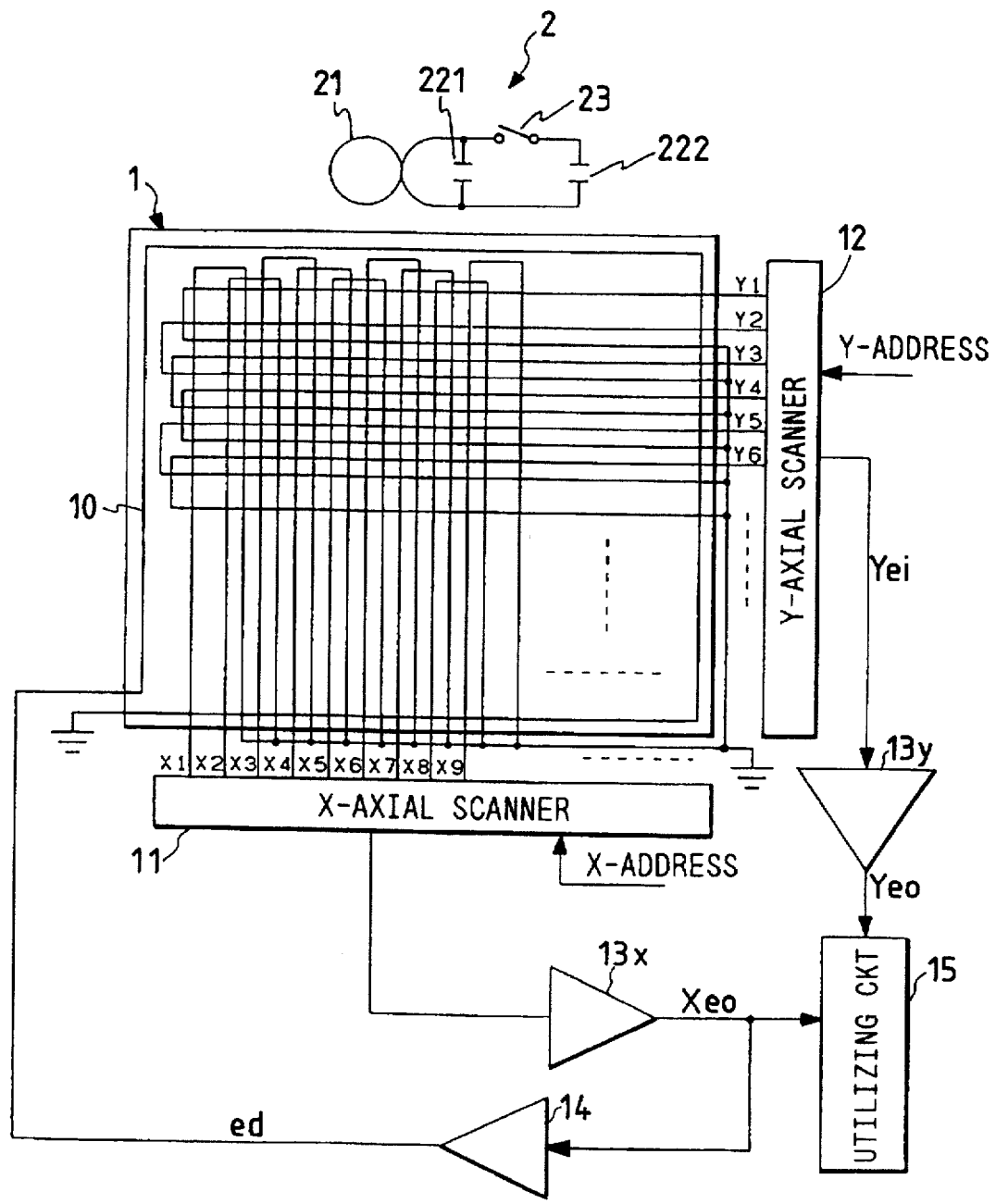
FIG. 1 is an explanatory diagram showing a tablet in a cordless digitizer according to a first embodiment of the invention.
Figure 2A:
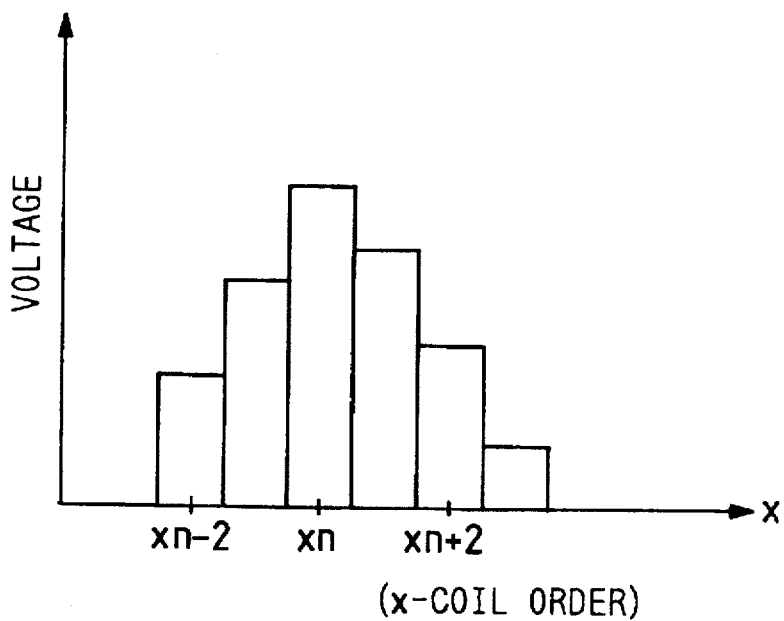
FIGS. 2(a) and 2(b) are graphical representations for a description of the operation for position determination of the cordless digitizer shown in FIG. 1.
Figure 2B:
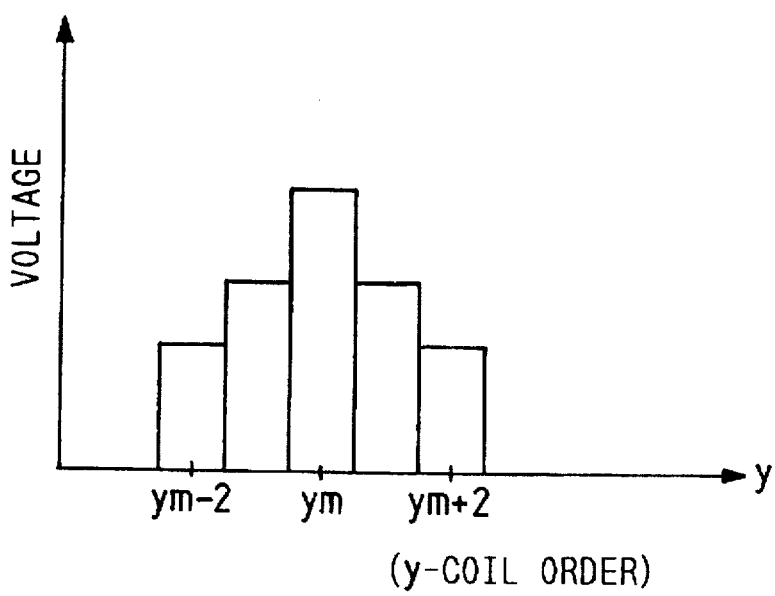
Figure 3A:
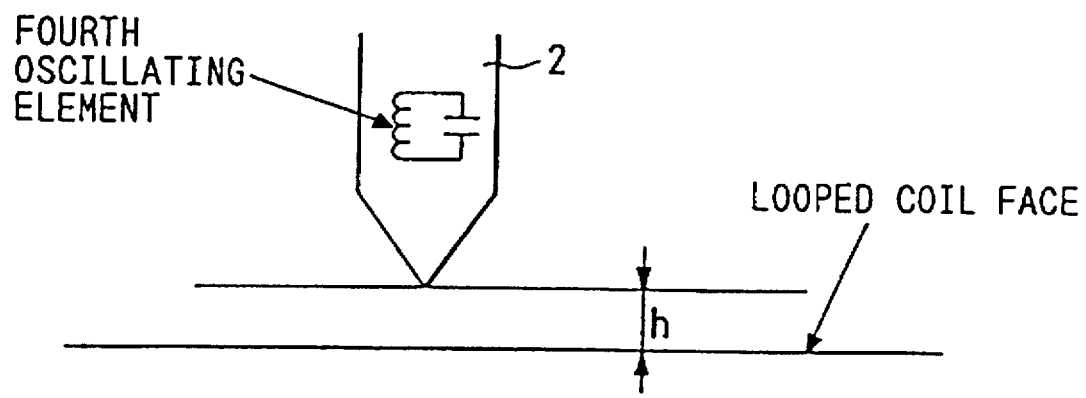
FIGS. 3(a) and 3(b) are explanatory diagrams for a description of the oscillation outputs of oscillating systems in the cordless digitizer according to the invention.
Figure 3B:
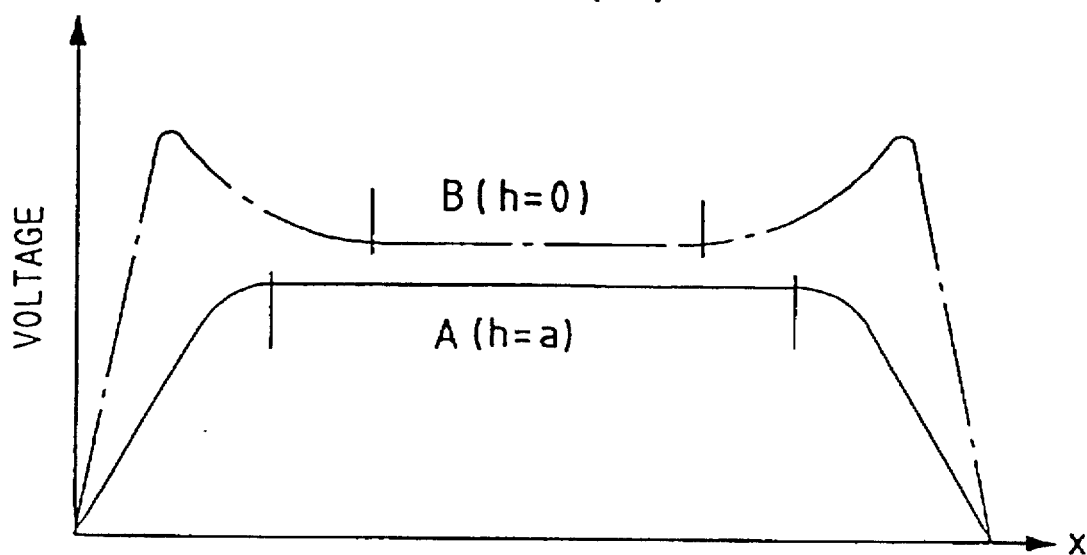

FIGS. 1 through 3 show a cordless digitizer according to a first embodiment of the invention. More specifically, FIG. 1 is a front view showing the arrangement of conductors on a tablet and the electrical connection of those conductors, and FIGS. 2(a) and 2(b) are graphical representations for a description of a position determining method, and FIGS. 3(a) and 3(b) are explanatory diagrams for a description of the outputs of oscillating systems which are formed by oscillating elements in the cordless digitizer according to the invention.

As shown in FIG. 1, a conductor loop 10 is provided, as a first oscillating element, in the periphery of a tablet 1. Furthermore, in the tablet 1, loop coils x1, x2, ... xn are arranged in the X-direction in the stated order (hereinafter referred to as "X-direction loop coils x1 through xn", when applicable), while loop coils y1, y2, ... ym in the Y-direction (hereinafter referred to as "Y-direction loop coils y1 through ym").

The X-direction loop coils x1 through xn serve as second oscillating elements, and a desired one of them is selected by an X-axis scanner 11. The X-direction loop coil thus selected is connected through a voltage amplifier 13x and a current amplifier 14 to the first oscillating element, or the conductor loop 10. The output of the current amplifier 13x is applied to a utilizing circuit 15, where it is utilized for determination of a position in the X-direction. The voltage amplifier 13x and the current amplifier 14 serve as a third oscillating element.

The Y-direction loop coils y1 through ym are provided for determination of a position in the Y-direction, and a desired one of them is selected by a Y-axis scanner 12. A voltage signal induced in the Y-direction loop coil thus selected is applied through a voltage amplifier 13y to the utilizing circuit 15.

A position indicator 2 has a fourth oscillating element which comprises a coil 21, a first capacitor 221, and a second capacitor 222 connected to the first capacitor 221 by the operation of a switch 23.

It is assumed that the position indicator 2 is held optionally at a position on the tablet 1. First, in response to an address signal from the utilizing circuit 15, the contact point (the loop coil x1) of the left end of the X-axis scanner 11 is selected, so that a circuit is formed by the loop coil x1 (the second oscillating element), the voltage amplifier 13x and the current amplifier 14 (the third oscillating element), and the peripheral conductor loop 10 (the first oscillating element). When the position indicator 2 is set closed to the circuit, the output of the voltage amplifier 13x forming the third oscillating element exceeds a predetermined level. The output of the voltage amplifier is applied to the current amplifier 14, where it is amplified. The output signal of the latter 14 is applied to the peripheral conductor loop 10, thus causing a stable oscillation.

On the other hand, in the case where the position indicator 2 is away from the selected loop coil x1, the output of the voltage amplifier 13x will not reach the predetermined level, so that no stable oscillation is obtained.

On the other hand, under the condition that the loop coil x1 has been selected, the Y-axis scanner 12 operates to select the Y-direction loop coils one by one so that they are connected through the voltage amplifier 13y to the utilizing circuit 15, thus forming oscillating systems. If, in this case, the oscillating systems thus formed are successively in oscillating state, the fourth oscillating element of the position indicator 2 produces a magnetic field and/or an electric field, which induces a predetermined voltage in the Y-direction loop coils.

The X-direction loop coils are selected one by one in the above-described manner so that oscillating systems are formed one after another with the X-direction loops coils different in position. And the outputs of the oscillating systems (the voltage amplifier 13x) and the outputs of the Y-direction loop coils (the voltage amplifier 13y) are measured successively.

As a result of the measurement, in each of the X- and Y-directions, output voltages corresponding to the positions of the selected loop coils are obtained as shown in FIGS. 2(a) and 2(b).

The utilizing circuit 15 processes those output voltages according to a predetermined operation expression, to obtain coordinates in the X- and Y-directions.

In the cordless digitizer thus organized, the position indicator 2 has the capacitor 222 which is connected to the coil 21 by the operation of the switch 23. The connection of the capacitor 222 changes the oscillating frequency of each of the oscillating systems formed during the measurement. Hence, the "on" and "off" states of the switch 23 can be detected with the utilizing circuit 15 measuring the frequency of the output voltage when the position is determined.

FIGS. 3(a) and 3(b) are obtained by plotting the output voltages of the oscillating systems which are formed in the above-described manner. More specifically, FIG. 3(a) shows a method of measuring the output voltages of the oscillating systems. That is, in the method, the output of the voltage amplifier 13x is measured under the condition that the fourth oscillating element of the position indicator 2 is held at a position which is at a height of "h" from the loop coil surface of the tablet 1 and is right above a desired one of the X-direction loop coils forming the oscillating systems.

FIG. 3(b) is obtained by plotting the results of the measurement. By determining the distance h between the position indicator 2 and the loop coil surface according to the diameter of the loop coil, the position indicator can be used over a wide range.

Although, in the embodiment, the first oscillating element is provided in the periphery of the tablet 1, the position indicator can be used over a wide range by providing a cover or the like on the loop coil surface of the tablet 1 so that the position indicator 2 is maintained at a suitable height.

In the above-described embodiment, the fourth oscillating element of the position indicator is the LC resonance circuit; however, it may be formed by using a magnetic substance or an electrically conductive material.

In addition, the third oscillating element may be so modified that, instead of the amplifiers, a so-called negative resistance circuit may be employed which is negative in volt-ampere characteristic.

In the cordless digitizer according to the above-mentioned embodiment, the conductor loop is provided, as the first oscillating element, in the periphery of the tablet, and the first oscillating element and the loop coils arranged in the direction of X-axis form the oscillating systems, which relatively reduces the number of oscillating systems for measurement. Thus, with the cordless digitizer, the total time required for the measurement is decreased.

In the cordless digitizer of the above-mentioned first embodiment, the conductor loop which is the first oscillating element is not orthogonal with the loop coils which are the second oscillating elements (similarly as in the case of the first previous application). Hence, even when the position indicator is not on the tablet, the electromagnetic coupling between the parts of the first and second oscillating elements which are extended in the direction of Y-axis (or the electromagnetic coupling between the parts of the first and second oscillating elements which are extended in the direction of X-axis) is strong, and the first through third oscillating elements form oscillating systems, which are placed in oscillating state. As a result, the difference between the outputs provided respectively when the position indicator is on the tablet and when not; that is, the S/N ratio is low.

Figure 4:
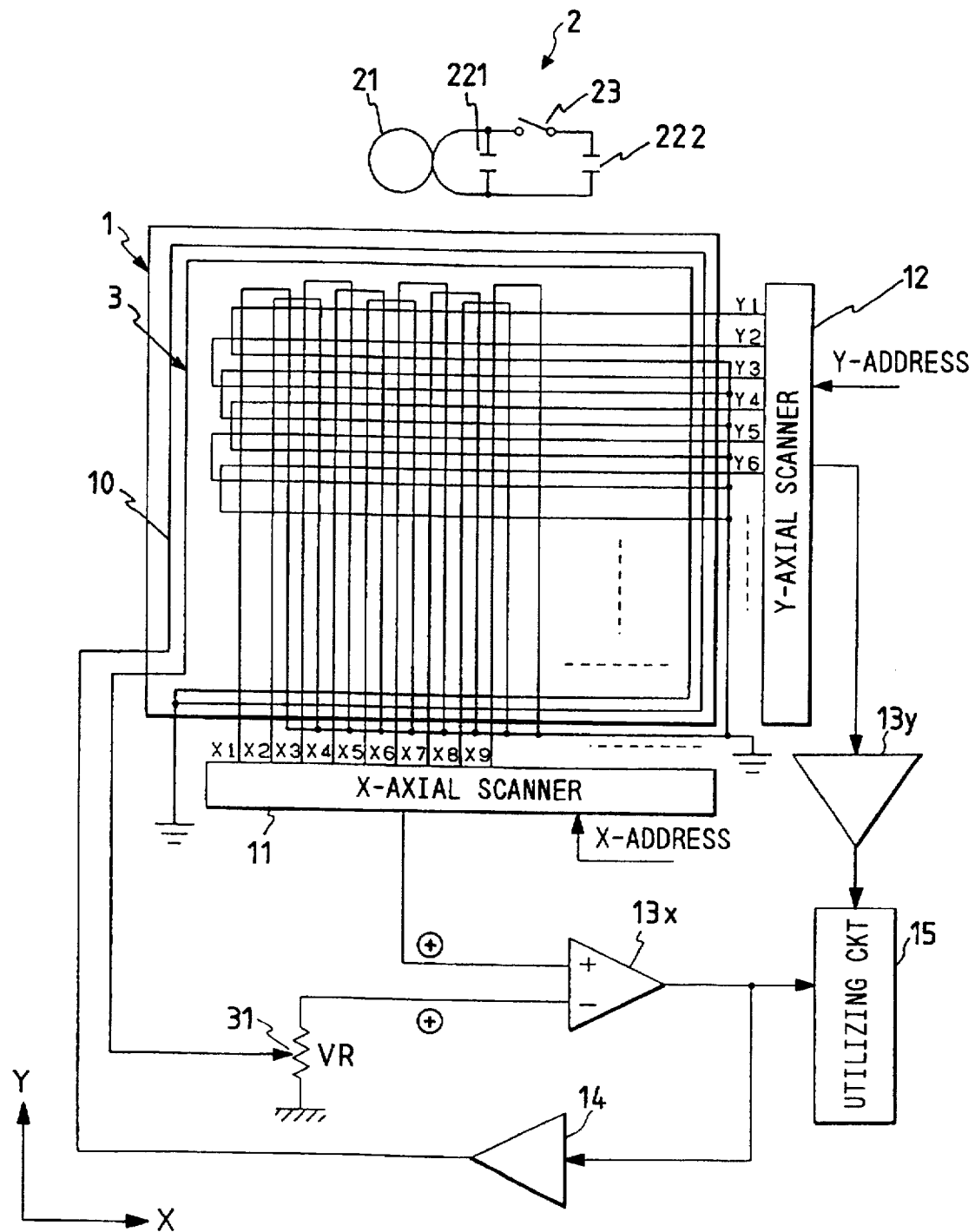
FIG. 4 is a block diagram showing a cordless digitizer according to a second embodiment of the invention.
Figure 5:
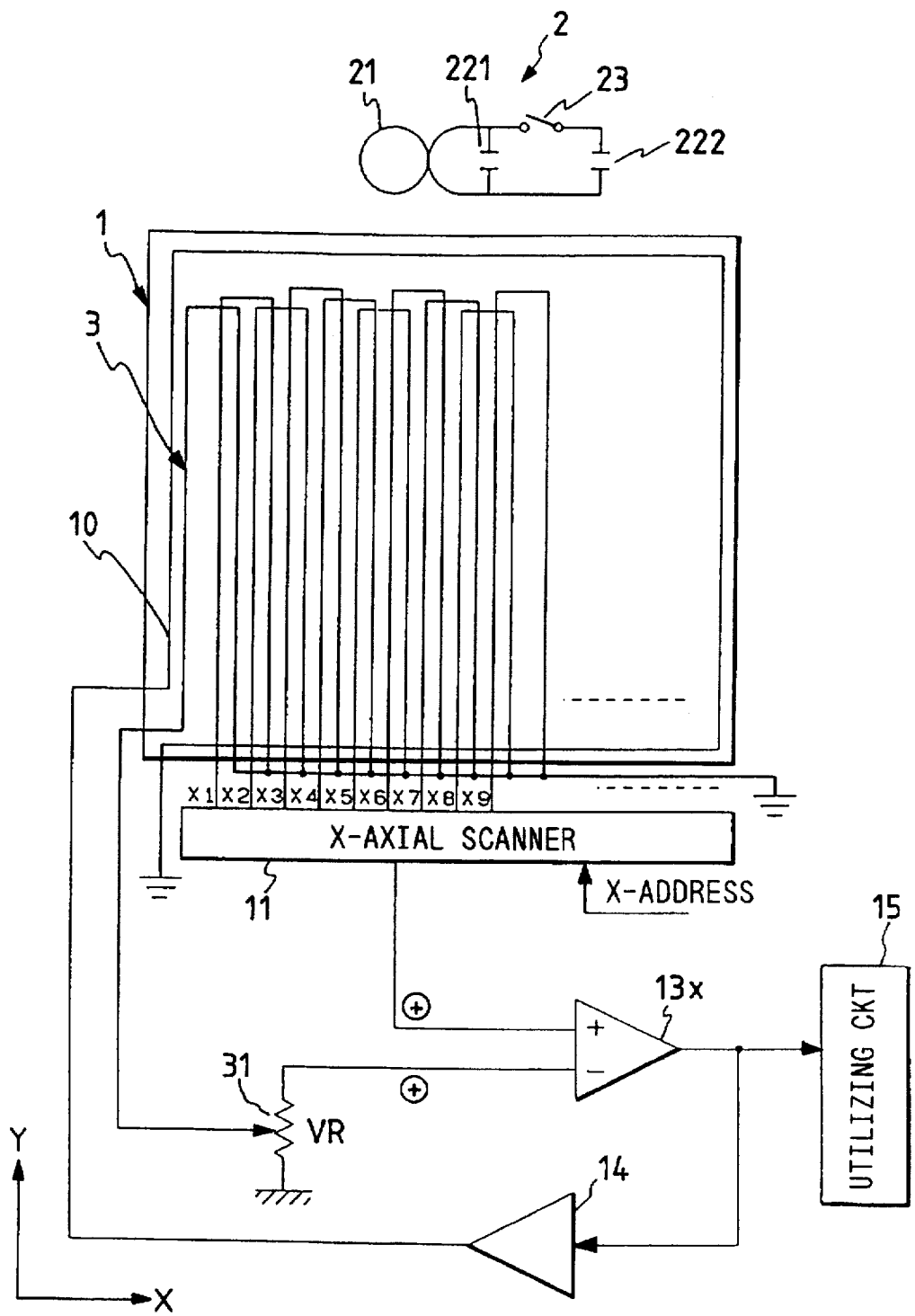
FIG. 5 is a block diagram showing a cordless digitizer according to a third embodiment of the invention.
Figure 6:
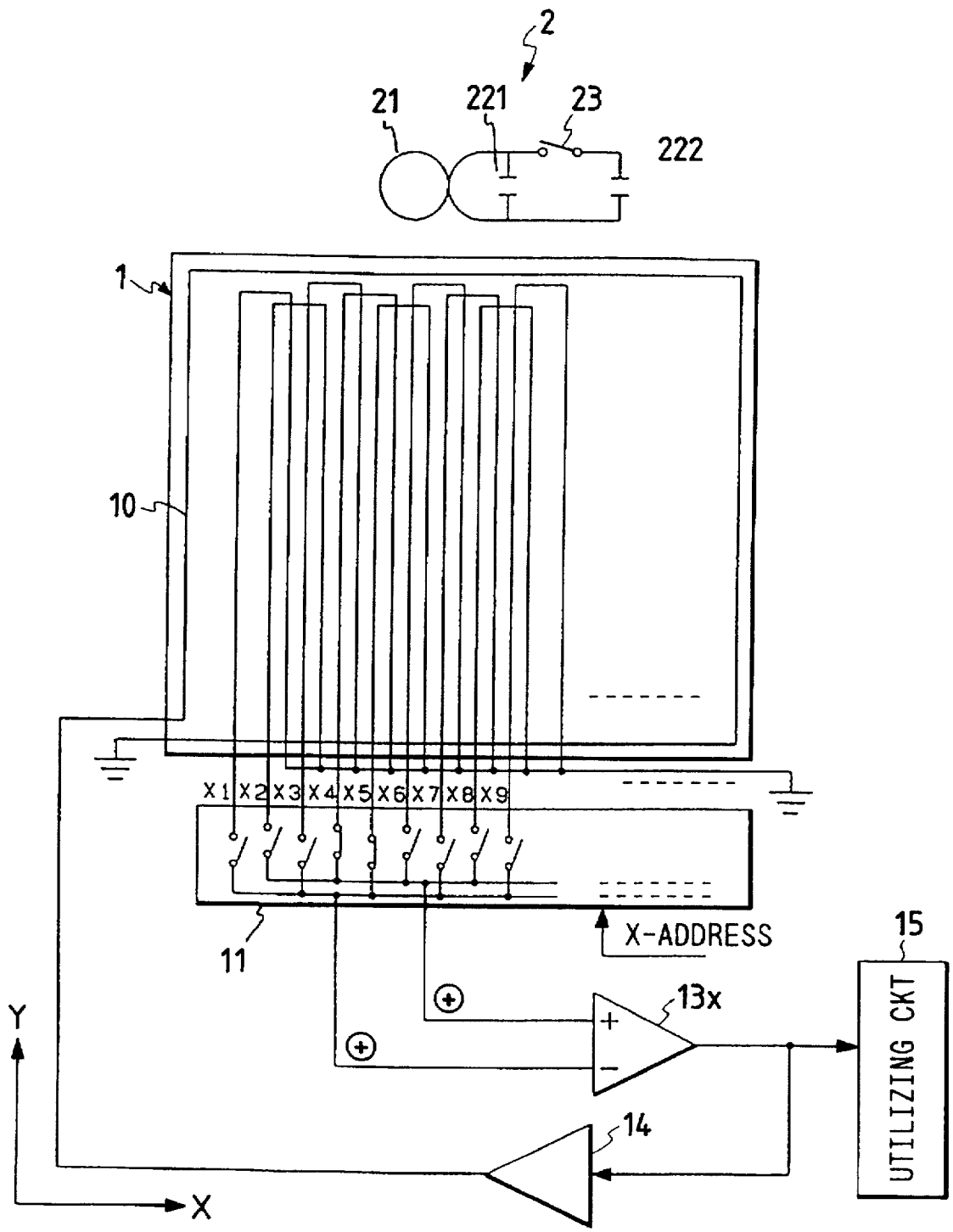
FIG. 6 is a block diagram showing a cordless digitizer according to a fourth embodiment of the invention.

FIGS. 4 through 6 are block diagrams showing cordless digitizers according to second to fourth embodiments of the invention, which eliminate the problem with the first embodiments. In those figures, parts corresponding functionally to those which have been described with reference to FIG. 1 showing the first embodiment are therefore designated by the same reference numerals or characters.

FIG. 4 shows a cordless digitizer according to the second embodiment of the invention. In the cordless digitizer, oscillating systems are formed by a first oscillating element which is a conductor loop arranged in the periphery of a tablet 1; second oscillating elements which are loop coils arranged on the tablet in the direction of X-axis and in connection with positions on the tablet (hereinafter referred to as "X-direction loop coils"), a third oscillating element comprising an X-axis scanner 11 for selecting a desired one of the coil loops, a voltage amplifier 13x for amplifying the output of the X-axis scanner 11, and a current amplifier 14 connected to the voltage amplifier 13x, and a fourth oscillating element which is formed by a coil 21, a first capacitor 221, and a second capacitor 222 connected by the operation of a switch 23 in a position indicator 2. Furthermore, loop coils are arranged on the tablet 1 in the direction of Y-axis and in connection with positions on the tablet 1; that is, they are conductors for determination of positional coordinates (hereinafter referred to as "Y-direction loop coils", when applicable). The Y-direction loop coils are connected through a Y-axis scanner 12 and a voltage amplifier 13y to a utilizing circuit 15. The latter 15 receives the outputs of the voltage amplifiers 13x and 13y to measure the output voltages of the oscillating systems, and performs a predetermined arithmetic operation to determine the coordinates of the position indicator 2. The coordinates of the position indicator 2 are determined in the same manner as in the above-described first embodiment of the invention.

Further in FIG. 4, reference numeral 3 designates a conductor loop, or an oscillation preventing conductor which is arranged in the periphery of the tablet 1 similarly as in the case of the first oscillating element. The conductor loop 3 is connected through a resistor 31 to one of the input terminals of the voltage amplifier 13x (the inversion input terminal) which is a differential amplifier in the third oscillating element.

It is assumed that the position indicator 2 is not set on the tablet 1. The first oscillating element 10 or any one of the second oscillating elements (the X-direction loop coils) induces a voltage when excited by ambient noises such as radio waves. That is, a predetermined voltage signal is applied to the other input terminal of the voltage amplifier 13x (the non-inversion terminal).

At the same time, the conductor loop 3 is also excited to induce a voltage, which is applied through the resistor 31 to the inversion input terminal of the voltage amplifier 13x. In the case where the voltage signal from the X-axis scanner 11 is equal to or approximate to that from the conductor loop 3, the difference between those voltage signals is outputted by the voltage amplifier 13x; that is, in this case the voltage signal outputted by the voltage amplifier 13x is not large enough to place the oscillating system in oscillating state. Thus, when the position indicator 2 is not on the tablet 1, no oscillation is made by the first to third oscillation elements.

The resistor 31 is a variable resistor to adjust the voltage signal which the oscillation preventing conductor 3 applies to the voltage amplifier 13x. The variable resistor is suitably adjusted in resistance, so as not to cause the oscillation in the case where the position indicator 2 is not on the tablet 1.

When the position indicator 2 is positioned on the tablet 1, the first to fourth oscillating elements form an oscillating system, and a voltage induced in the oscillating system thus formed (or a voltage applied to the non-inversion terminal of the voltage amplifier 13x) is higher than a voltage induced in the oscillation preventing conductor 3 (or a voltage applied to the non-inversion terminal of the voltage amplifier 13x). Hence, the voltage amplifier 13x outputs a voltage signal which is high enough to activate the oscillating system. As a result, the oscillating system is placed in oscillating state, which makes it possible to detect the position of the position indicator 2.

FIG. 5 is a diagram showing parts of the cordless digitizer which form oscillating systems according to a third embodiment of the invention. In the cordless digitizer, the oscillation preventing conductor 3 is a loop coil which is provided at the end of the group of the second oscillating elements (the X-direction loop coils). More specifically, the oscillation preventing conductor 3 which is a loop coil is similar in configuration to the X-direction loop coils, and is provided at the end of the group of X-direction loop coils. The loop coil 3 is connected through the resistor 31 to the voltage amplifier 13x.

In the case where the position indicator 2 is not on the table 1, an induction voltage provided by the excitation of the first oscillating element 10 or the second oscillating element (the X-direction loop coil) is canceled out by the induction voltage of the loop coil 3, so that no oscillation is made by the first through third oscillating elements. In the cordless digitizer according to the third embodiment of the invention, the oscillation preventing conductor is similar in configuration to the second oscillating element, which contributes to miniaturization of the cordless digitizer.

FIG. 6 is a diagram showing parts of the cordless digitizer which form oscillating systems according to the fourth embodiment of the invention. In the cordless digitizer shown in FIG. 6, when any one of the X-direction loop coils is selected, as the second oscillating element, by the X-axis scanner 11, another X-direction loop adjacent to it is employed as the oscillation preventing conductor. That is, from among the X-axis loop coils (the second oscillating elements) two adjacent ones are selected by the X-axis scanner. In other words, the X-axis loop coils are selected by the X-axis scanner two at a time in such a manner that the two thus selected are adjacent to each other. The two loop coils are connected to a differential amplifier, or a voltage amplifier 13x.

It is assumed that the position indicator 2 is not on the tablet 1. When, in this case, the first or second oscillating elements are excited, for instance, by ambient noises such as radio waves, voltage signals are induced also in two loop coils (x4 and x5 in FIG. 6) selected by the X-axis scanner 11. The two loop coils are similar in configuration to each other, and are located adjacent to each other on the tablet 1. Hence, the voltage signals provided by the two loop coils are approximate to each other, and are canceled out by each other with the aid of the voltage amplifier 13x, so that no oscillation is made by the first through third oscillating elements. In the cordless digitizer, any one of the second oscillating elements can be used as the oscillating preventing conductor; that is, it is unnecessary for the cordless digitizer to have the oscillating preventing means separately.

In the above-described cordless digitizer according to the second and third embodiments of the invention, the variable resistor is employed as the resistor 31 connected to the oscillation preventing conductor 3; however, it may be formed by using ordinary resistors.

As was described above, in the cordless digitizer of the invention, the unwanted oscillation is eliminated when the position indicator is not on the tablet. Hence, the difference between the outputs provided respectively when the position indicator is on the tablet and when not; that is, the S/N ratio is increased, resulting in an improvement of the coordinate reading accuracy.

However, the above-described cordless digitizers of the third and fourth embodiments suffer from the following difficulty: That is, in the cordless digitizer, in order to improve the detection accuracy of a position indicated by the position indicator, the X-direction loop coils are laid over the Y-direction loop coils. Hence, the output of the compensating loop is affected by the resonance circuit, thus eliminating even the output of the latter.

Figure 7:
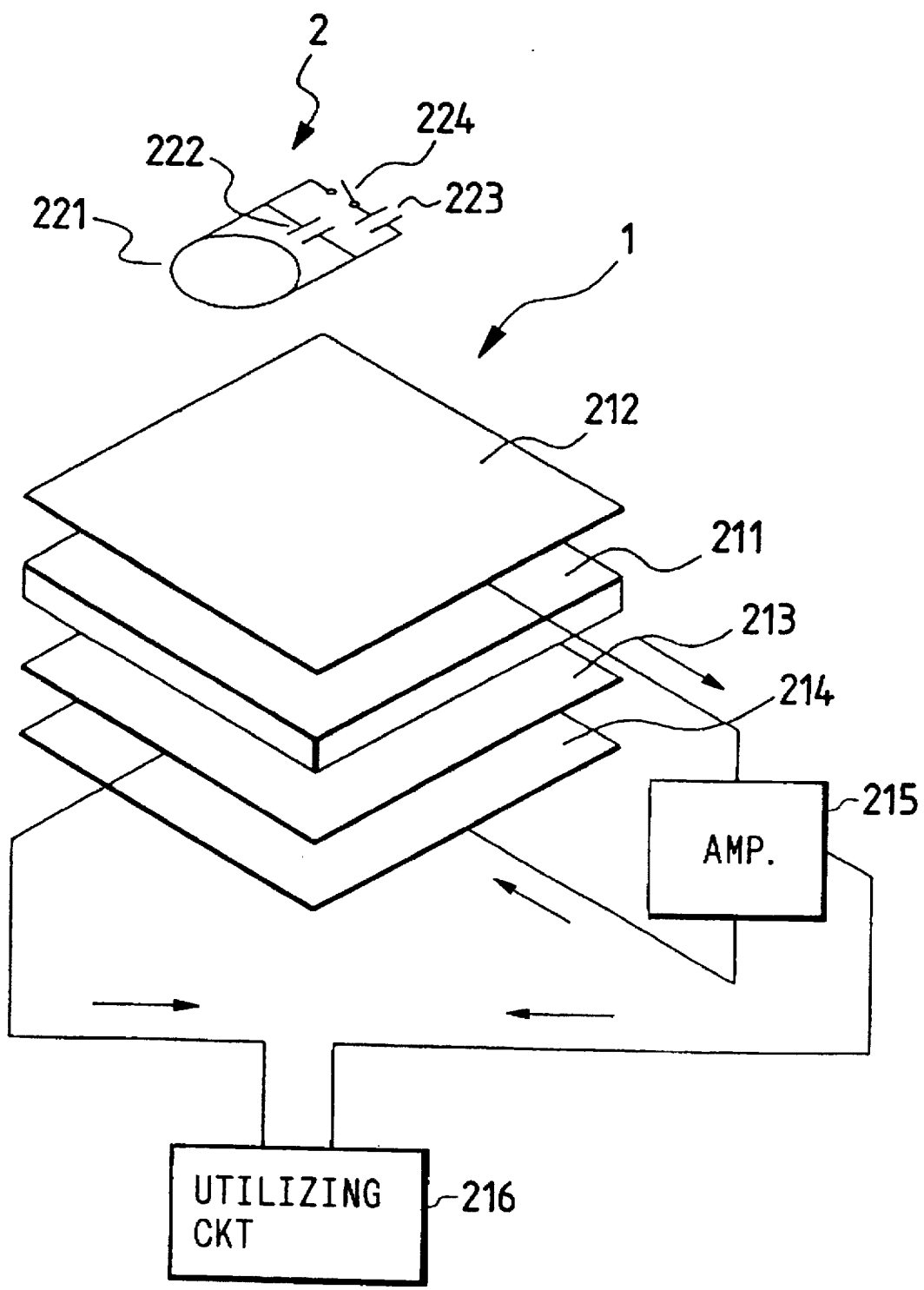
FIG. 7 is an explanatory diagram showing a cordless digitizer according to a fifth embodiment of the invention.

FIGS. 7 through 13 are diagrams for a description of a cordless digitizer according to a fifth embodiment of the invention, which eliminates the difficulty with the above-mentioned third and fourth embodiments. FIG. 7 outlines the arrangement of the cordless digitizer according to the invention.

In FIG. 7, reference numeral 1 designates a tablet; and 2, a position indicator.

The tablet 1 comprises: a substrate 211 of transparent glass or the like; an X-direction loop coil assembly 212 which is made up of a plurality of loop coils (described later) formed on the upper surface of the substrate 211; a Y-direction loop coil assembly 213 which is made up of a plurality of loop coils (described later) formed on the lower surface of the substrate 211; a drive coil 214 provided below the Y-direction loop coils 213; an amplifier circuit 215 which processes the outputs of the X-direction loop coil assembly 212 as required, which are applied to the drive coil 214; and a utilizing circuit 216 which receives the outputs of the amplifier circuit 215 and of the Y-direction loop coils 213, to identify a position indicated by the position indicator 2 or switch data.

The X-direction loop coil assembly and the Y-direction loop coil assembly are formed on the substrate 211 by vapor deposition or printing. The substrate 211, the X-direction loop coil assembly 212, the Y-direction loop coil assembly 213, and the drive coil 214 are stacked one on another while being insulated from one another, thus forming one unit.

The position detector 2 is made up of an indicating coil 221, a basic capacitor 222 connected to the indicating coil 221 to form a resonance circuit, a switch capacitor 223 which is connected in parallel to the basic capacitor 222, to change the circuit constant of the resonance circuit.

The following is a brief description of the operation of the cordless digitizer thus organized.

It is assumed that the position indicator 2 is on the tablet 1. In response to noises produced by the tablet or ambient noises, the position indicator 2 (the resonance circuit), the X-direction loop coil assembly 212, the amplifier circuit 215, and the drive coil 214 form oscillating systems.

In this case, the position indicated by the position indicator is identified from the outputs of the X-direction loop coil assembly 212 and the outputs of the Y-direction loop coil assembly 213.

That is, the position indicated in the direction of X-axis by the position indicator (hereinafter referred to as "an indicated X-direction position" or merely as "an X-direction position") is determined by detecting the loop coil in the X-direction loop coil assembly which concerns the oscillation, whereas the position indicated in the direction of Y-axis by the position indicator (hereinafter referred to as "an indicated Y-direction position" or merely as "a Y-direction position") is determined by detecting the outputs of the Y-direction loop coil assembly 213 and determining the loop coil in the assembly 213 which is highest in output.

Operating data of the position indicator; that is, whether or not the switch 224 is operated is determined from the oscillating frequencies when the above-described oscillating systems have been formed. An oscillating system oscillates at a frequency based on its circuit constant; that is, it will oscillate at a predetermined frequency until it is affected by an external factor. In the cordless digitizer, the circuit constant of the resonance circuit in the position indicator 2 is changed with the operation of the switch 224, and accordingly the oscillating frequency of the oscillating system is changed when the switch 224 is operated. Hence, the operation of the switch 224 can be detected from detection of the variation in the oscillating frequency.

Identification of the position indicated by the position indicator and the operating data of the latter is carried out by the utilizing circuit 216.

If summarized, when the position indicator 2 is positioned on the tablet 1, the oscillating systems are formed, and the position indicated by the position indicator and the operating data of the latter are identified from the states of the oscillating systems thus formed.

Figure 8:
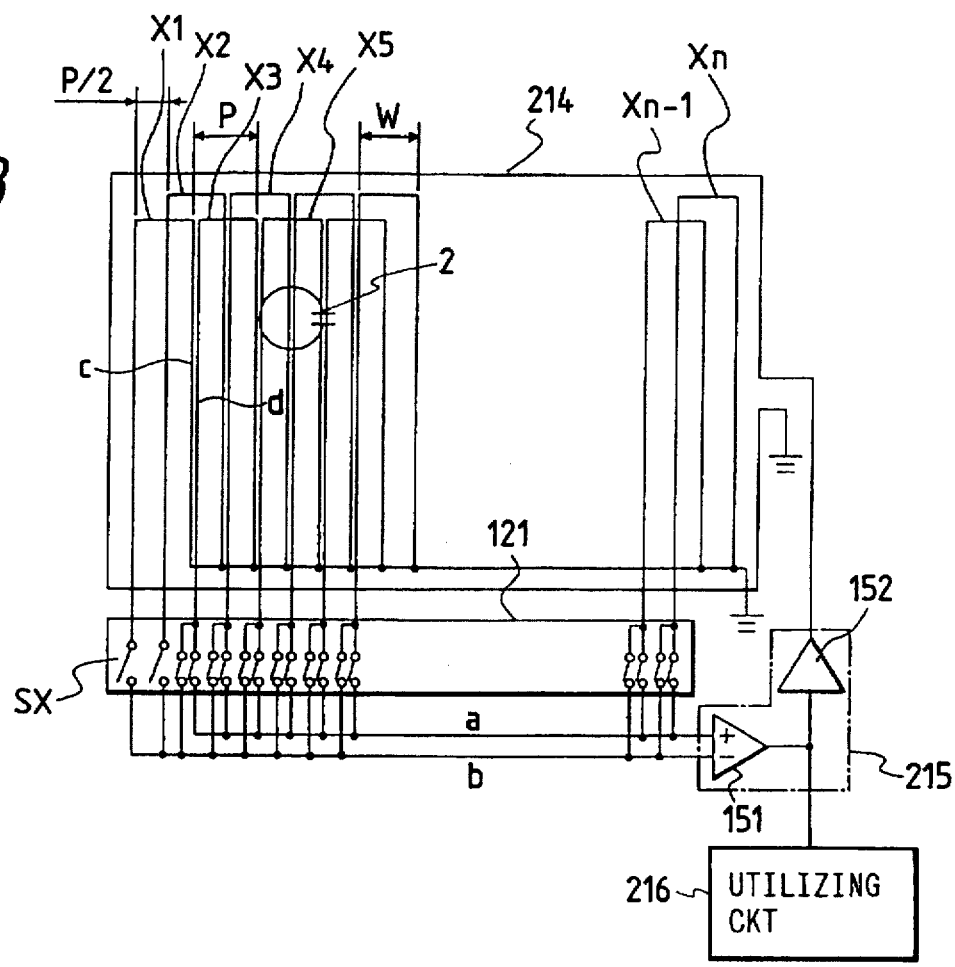
FIG. 8 is an explanatory diagram showing the arrangement of an X-direction loop coil assembly, drive coil, and amplifier circuit in the cordless digitizer.

In the cordless digitizer of the invention, the loop coils are essential components, and provided as position detecting elements. The loop coils together with selecting means for selecting those loop coils one by one are designed as follows:

FIG. 8 shows the arrangement of the X-direction loop coil assembly 212, the drive coil 214, and the amplifier circuit 215. Further in FIG. 8, reference characters X1 through Xn designate the loop coils forming the X-direction loop coil assembly 212; 121, a scanner circuit for selectively connect the loop coils to the amplifier circuit 215; 151, a voltage amplifier for amplifying an input signal with a predetermined amplification degree; 152, a current amplifier for amplifying the output signal of the voltage amplifier 151 until it is saturated, or until it becomes a rectangular wave signal. Further in FIG. 8, reference character SX denotes each of the switches in the scanner circuit 121.

In FIG. 8, the X-direction loop coil assembly 212 is made up of a plurality of rectangular loop coils. Those loop coils are divided into a first group including the loop coils X1, X3, X5, . . . Xn-1, and a second group including the loop coils X2, X4, X6 . . . Xn.

In the first group, the loop coils have a width of W, and are equal in configuration to one another. Those loop coils are arranged in the direction of X-axis at intervals of D slightly larger than W.

The coil width W and the arranging interval D are depend on a cordless digitizer to be formed. Quantitatively stated, those values are determined to the extent that, for instance, the right long side (c in FIG. 8) of the loop coil X1 and the left long side (d in FIG. 8) of the loop coil X3 are closed to each other, but not overlapped with each other. For instance, in the case where a conductor 2 mm in width is employed to form the loop coils, the coil width W is 40 mm, and the arranging interval D is 42.5 mm, and the gap between the adjacent conductors is 0.5 mm. However, it should be noted that the invention is not limited thereto or thereby.

The second group is fundamentally equal in arrangement to the above-described first group. That is, the coil loops are also W in width, and are arranged at the intervals of D. However, it should be noted that the coil loops in the second group are shifted as much as D/2 from those in the first group.

One end of each of the loop coils X1 through Xn is grounded, and the other is connected to the scanner circuit 121.

Figure 9:
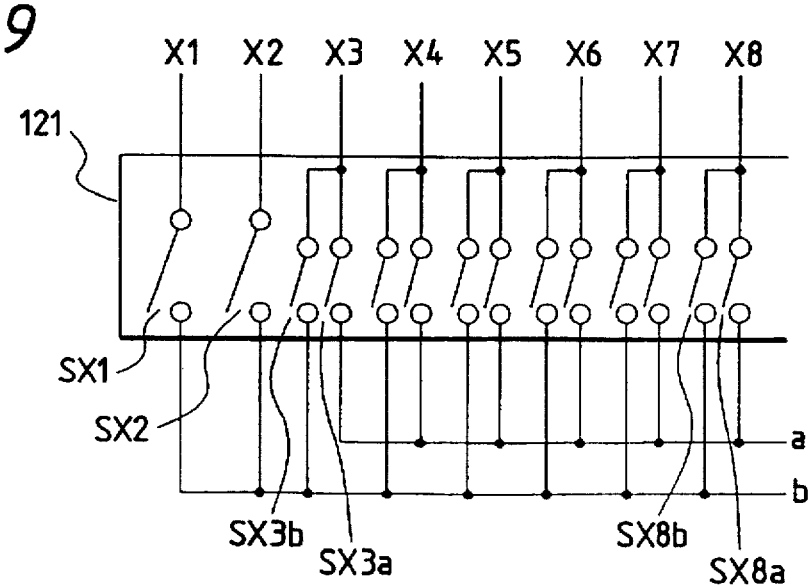
FIG. 9 is an explanatory diagram showing the arrangement of an X-direction scanner circuit in the cordless digitizer.

The scanner circuit 121, as shown in FIG. 9, includes a plurality of switches SX1 through SXnb (switches SX9, SX10, . . . not shown), which are adapted to apply the outputs of the loop coils X1 through Xn to the positive input terminal (a) and negative input terminal (b) of the voltage amplifier 151, similarly as in the selecting operation of the compensating conductor loop in the above-described previous embodiment. The loop coil connected to the positive terminal (a) serves as an aimed loop coil, and the loop coil connected to the negative input terminal (b) as a compensating loop coil. Among those loop coils, the loop coils X1 and X2 act as compensating loop coils only, and the remaining loop coils X3, X4, X5 and so forth act as aimed loop coils or compensating loop coils.

Figure 10:
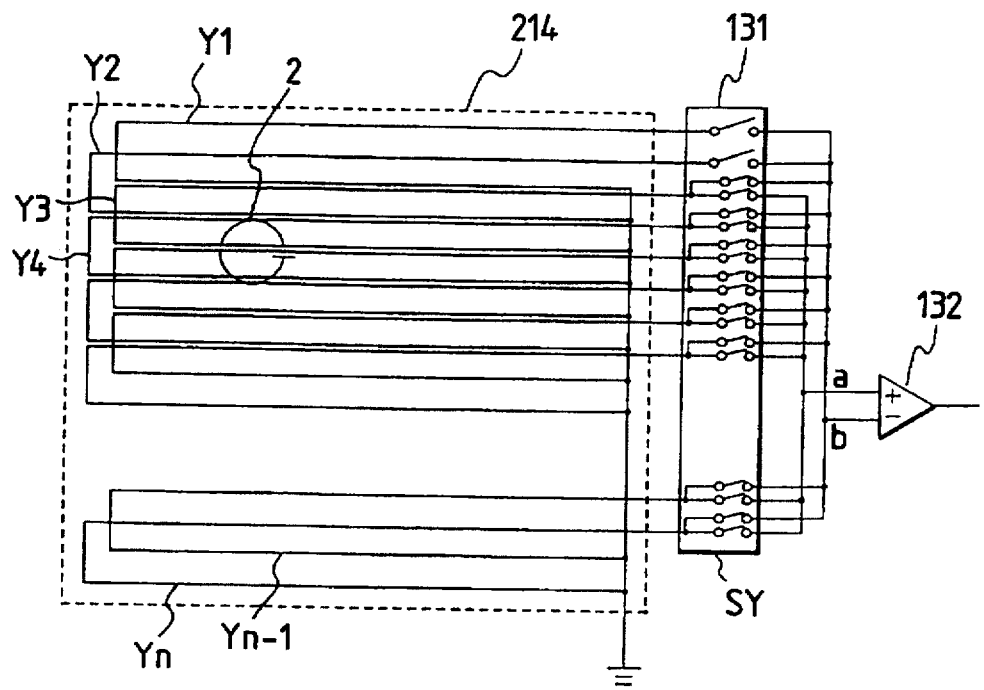
FIG. 10 is an explanatory diagram showing the arrangement of a Y-direction loop coil assembly in the cordless digitizer.
Figure 11:
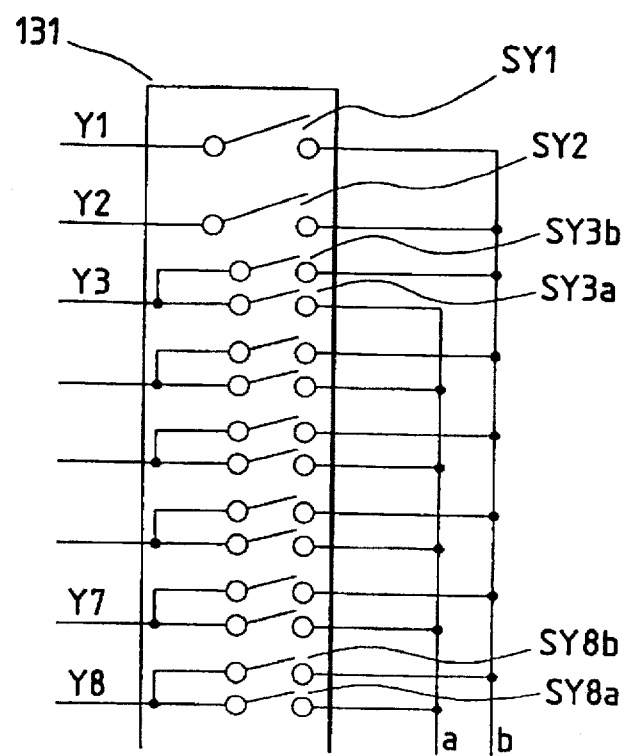
FIG. 11 is an explanatory diagram showing the arrangement of a Y-direction scanner circuit in the cordless digitizer.

On the other hand, the Y-direction loop coil assembly 213 is designed as shown in FIGS. 10 and 11.

Similarly as in the above-described X-direction loop coil assembly 212, the Y-direction loop coil assembly 213 is made up of rectangular loop coils Y1 through Yn, which are also W in coil width and are arranged at intervals of D. Those loop coils are divided into a first group which includes the loop coils Y1, Y3, Y5, . . . and Yn-1, and a second group which includes the loop coils Y2, Y4, Y6, . . . and Yn. The loop coils in the first group are shifted as much as D/2 from those in the second group, respectively.

A scanner circuit 131, similarly as in the above-described scanner circuit 121, includes switch circuits SY which are adapted to selectively connect the aimed loop coil and the compensating loop coil to the positive input terminal (a) and negative input terminal (b) of a voltage amplifier 132. The latter 132 is equivalent to the voltage amplifier 121 provided for the X-direction loop coil assembly. The voltage amplifier 132 utilizes the outputs of the aimed loop coil and of the compensating loop coil to eliminate an induction component from the drive coil 214 which acts directly on the Y-direction loop coil assembly.

In the cordless digitizer, a loop coil selecting operation is carried out as follows:

First, an operation of selecting loop coils from among the loop coils forming the X-direction loop coil assembly will be described. The scanner circuit 121 scans the loop coils successively beginning with the endmost one.

More specifically, the scanner circuit 121 operates as follows:

(1) The switches SX1 and SX3a are operated (being turned on), so that the loop coil X3 and the loop coil X1 are selected as the aimed loop coil and the compensating loop coil, respectively, and the output of the former is applied to the positive input terminal of the voltage amplifier 151 while the output of the latter is applied to the negative input terminal of the voltage amplifier 151. In this operation, the remaining switches are not operated (being kept turned off).

(2) The switches SX2 and SX4a are operated, so that the loop coil X4 and the loop coil X2 are selected as the aimed loop coil and the compensating loop coil, respectively.

(3) The switches SX3b and SX5a are operated, so that the loop coil X5 and the loop coil X3 are selected as the aimed loop coil and the compensating loop coil, respectively.

(4) The switches SX4b and SX6a are operated, so that the loop coil X4 and the loop coil X2 are selected as the aimed loop coil and the compensating loop coil, respectively.

(5) The switches SX5b and SX7a are operated, so that the loop coil X4 and the loop coil X2 are selected as the aimed loop coil and the compensating loop coil, respectively.

The scanning operation is continued in the same manner until the loop coil Xn is selected. The outputs of those loop coils are utilized to determine the position indicated by the position indicator 2.

Figure 12:
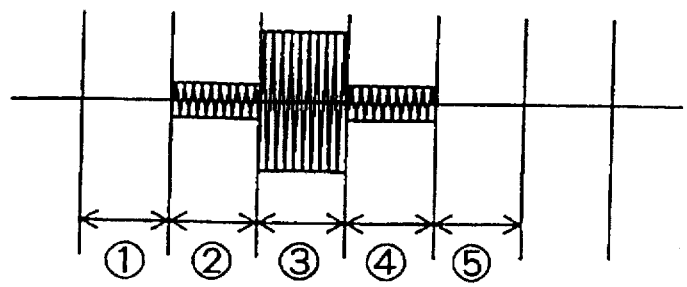
FIG. 12 is an explanatory diagram for a description of the outputs of the X-direction loop coil assembly.

FIG. 12 shows the outputs of the X-direction loop coils in the above-described scanning operation; that is, the outputs of the voltage amplifier 151 in the case where the position indicator 2 (and accordingly its indicating coil 221) is on the loop coil X5 (as shown in FIG. 8). In FIG. 12, reference numerals correspond to those used in the above description of the scanning operation. For instance, in FIG. 12, the reference mark (1) corresponds to the output in the case where the loop coil X3 is selected as the aimed loop coil while the loop coil X1 is selected as the compensating loop coil.

Thus, in the above-described scanning operation, the resultant output signals are as follows: That is, when the loop coil X5 is selected as the aimed loop coil, the output signal is highest (as indicated at (3) in FIG. 12); and when the loop coils X4 and X6 beside the loop coils X5 are selected, the output signals are lower (as indicated at (2) and (4) in FIG. 12).

The utilizing circuit 216 receives those output signals to determine the X-direction position indicated by the position indicator 2.

An operation of selecting loop coils from among the loop coils forming the Y-direction loop coil assembly is carried out in the same manner as the above-described operation of selecting loop coils from among the X-direction loop coil assembly.

Figure 13:
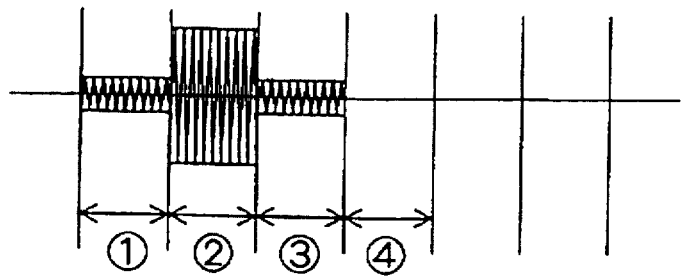
FIG. 13 is an explanatory diagram for a description of the outputs of the Y-direction loop coil assembly.

Let us consider the case where, for instance, the position indicator 2 is positioned on the loop coil Y4 (as shown in FIG. 10). In this case, the output signal of the voltage amplifier 132 is highest as shown in FIG. 13 when the loop coil Y4 is selected as the aimed loop coil (as indicated at (2) in FIG. 13); and it is lower when the loop coils Y3 and Y5 beside the loop coil Y4 are selected (as indicated at (1) and (3) in FIG. 13).

The utilizing circuit 216 uses those output signals to determine the Y-direction position indicated by the position indicator 2.

Figure 14:
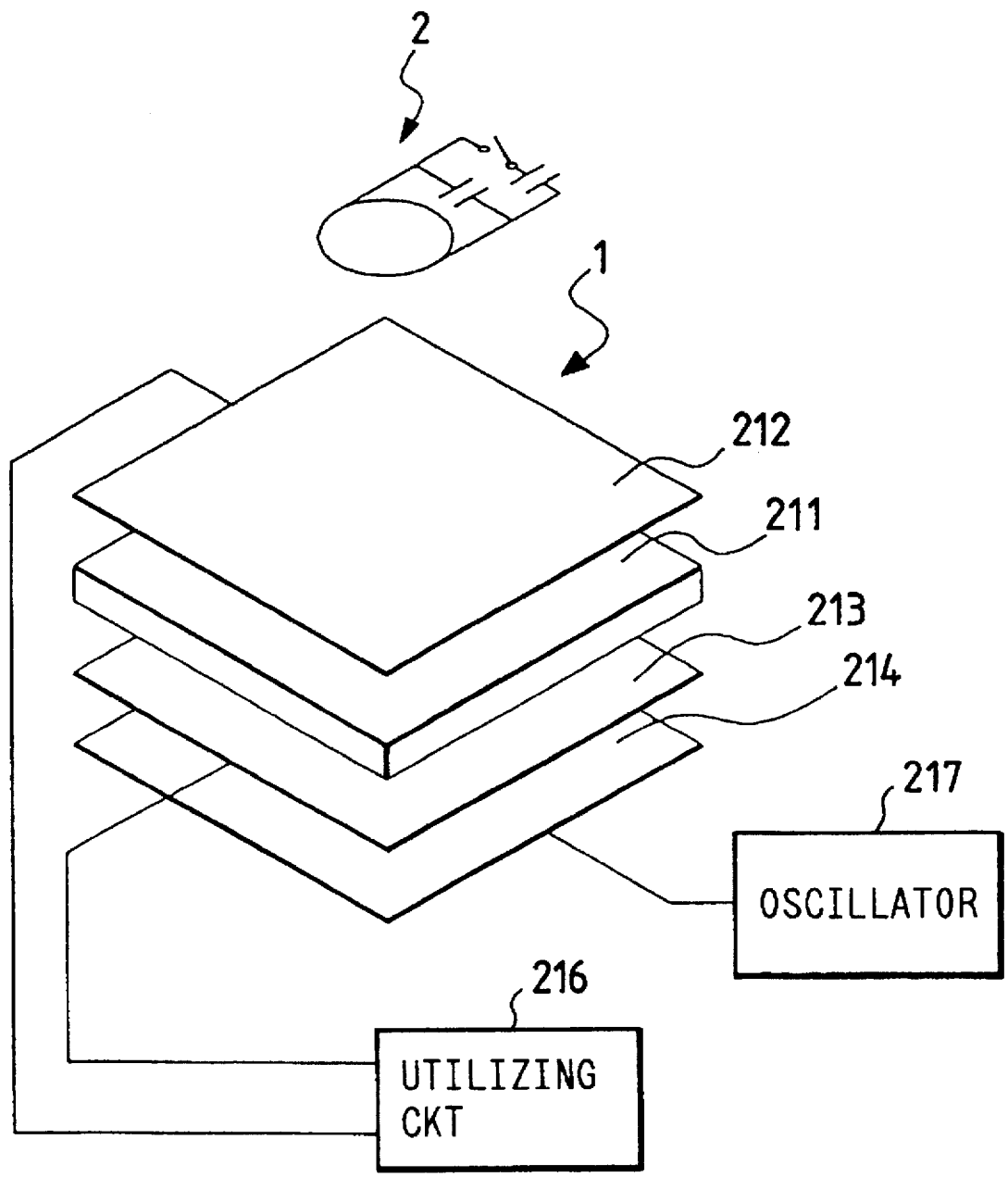
FIG. 14 is an explanatory diagram showing a cordless digitizer according to a sixth embodiment of the invention.
Figure 15:
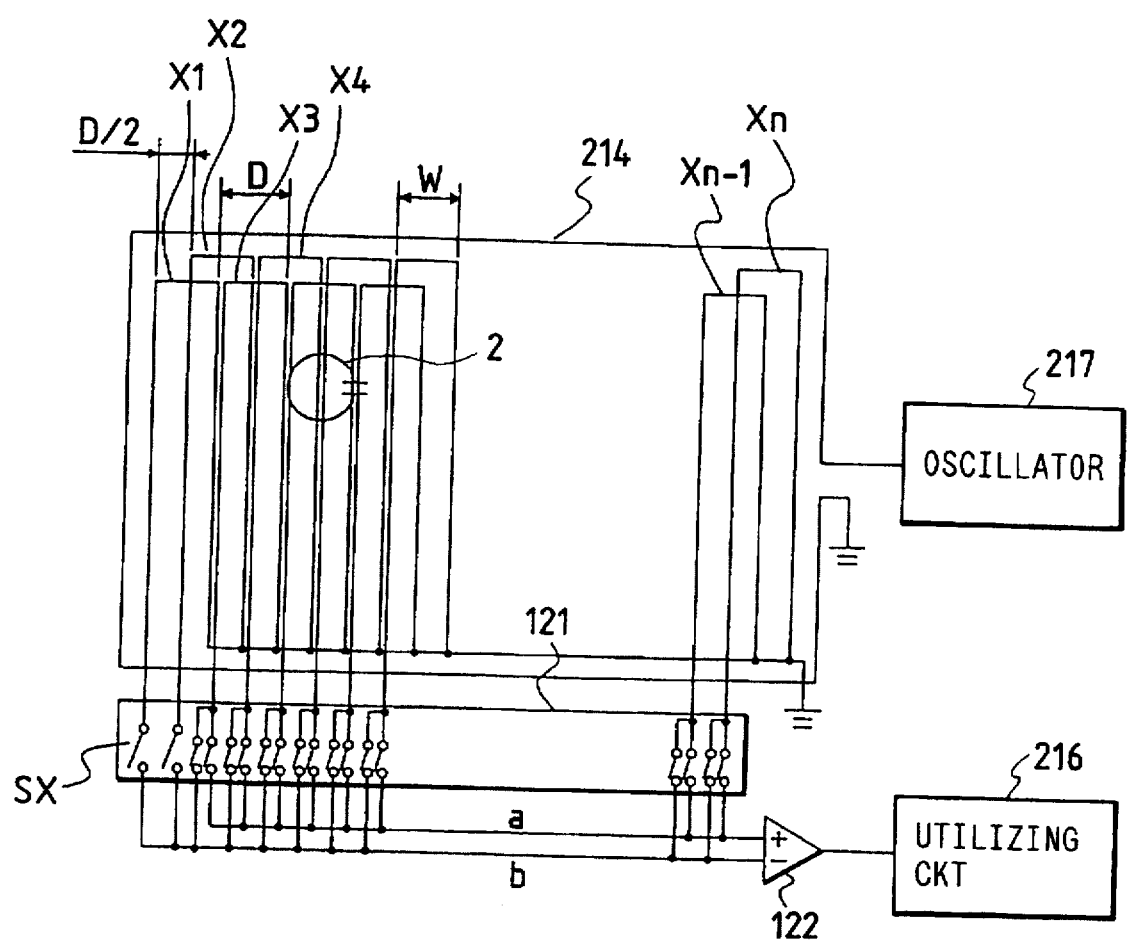
FIG. 15 is an explanatory diagram showing the arrangement of an X-direction loop coil assembly, drive coil, and amplifier circuit in the cordless digitizer shown in FIG. 14.

FIGS. 14 and 15 show a cordless digitizer according to a sixth embodiment of the invention. In those figures, parts corresponding functionally to those which have been described with reference to the fifth embodiment are therefore designated by the same reference numerals or characters. In FIG. 15, reference numeral 122 designates an X-direction voltage amplifier for the X-direction loop coil assembly 212, which is equivalent to the Y-direction voltage amplifier 132 in the fifth embodiment.

The sixth embodiment is different from the fifth embodiment in that an oscillator 217 for generating a signal having a predetermined frequency is provided in the tablet 1.

The output signal of the oscillator 217 is applied to the drive coil 214, so that the latter 214 provides a magnetic field in correspondence to the signal. The magnetic field thus provided acts on the resonance circuit (comprising the indicating coil 221, the basic capacitor 222, the switch capacitor 223, and the switch 224) of the position indicator 2, to induce current in the resonance circuit. The current thus induced produces a magnetic field around the indicating coil 221 of the resonance circuit. The magnetic field thus produced acts on the X-direction loop coil assembly 212 and the Y-direction loop coil assembly 213. As a result, in the X-direction loop coil assembly 212 and the Y-direction loop coil assembly 213, voltage signals are induced according to the position indicated by the position indicator 2 similarly as in the case of the above-described fifth embodiment. The voltage signals are utilized to determine the position indicated by the position indicator.

As was described in detail, in the cordless digitizers according to the fifth and sixth embodiments of the invention, when a loop coil is selected as the aimed loop coil, a loop coil adjacent to the aimed loop coil is selected as the compensating loop coil, and therefore the induction component due to the direct action of the drive grid can be effectively eliminated. Furthermore, since the loop coils in each of the loop coil assemblies are driven in a time-division mode, the position detection is achieved with high resolution.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A cordless digitizer, comprising:
   a tablet including position detecting elements formed of loop coils, error compensating elements formed of loop coils, and an auxiliary element formed of a coil which is arranged around a reading range of said tablet; and
   a position indicator including a position indicating element; and
   error compensating means which, when said position indicator is set at a position on said tablet, obtains first outputs according to interactions between said position detecting elements, said auxiliary element of said tablet and said position indicating element of said position indicator, and second outputs according to interactions between said error compensating elements, said auxiliary element of said tablet and said position indicating element of said position indicator, wherein said first and second outputs are compared to produce third outputs from which error output components caused by direct actions between said position detecting elements and said auxiliary element of said tablet have been eliminated;
   a position detecting loop coil assembly provided on said tablet which comprises loop coils arranged thereon at predetermined intervals in such a manner that adjacent loop coils are set close to one another but not overlapped with one another; and
   loop coil selecting means for selecting, from among said loop coils, a predetermined loop coil as a position detecting element, and a loop coil adjacent to said predetermined loop coil as an error compensating element.

2. A cordless digitizer as claimed in claim 1, in which said tablet has a plurality of loop coil assemblies different in the pitch of arrangement, and is provided with means for activating said loop coils in each of said plurality of loop coil assemblies in a time-division mode.

3. A cordless digitizer, comprising:
   a tablet;
   a position indicator;
   first oscillating means including a conductor loop arranged in the periphery of said tablet;
   second oscillating means including a plurality of individually selectable conductor loops which are arranged in connection with positions on said tablet, said first and second oscillating elements being provided on said tablet;
   third oscillating means through which said first and said second oscillating means are coupled to each other;
   fourth oscillating means provided in said position indicator, said first, second, third and fourth oscillating means forming oscillating systems that produce output signals utilized to detect a position on said tablet indicated by said position indicator; and
   an oscillation preventing means for eliminating error induction components in said oscillating systems caused by ambient noise acting directly on one of said first and second oscillating means to prevent oscillation by said first to third oscillating means when said position indicator is not indicating a position on said tablet;
   when an oscillating system formed by said first oscillating means, selected second oscillating means, third oscillating means, and fourth oscillating means is in oscillating state, said oscillation preventing means is operated so that said error induction components are removed from an output signal of said oscillation system, and the output signal of said oscillating system from which said error induction components have been removed is utilized to detect a position on said tablet indicated by said position indicator.

4. A cordless digitizer, comprising:
   a tablet;
   a position indicator;
   positional coordinate determining conductors;
   first oscillating means including a conductor loop arranged in the periphery of said tablet;
   second oscillating means including a plurality of conductor loops which are arranged in connection with positions on said tablet so as to be individually selectable;
   third oscillating means including an amplifier having two input terminals, which amplifies a difference between signals inputted to said two input terminals and outputs an amplified difference, and coupling said first oscillating element to said second oscillating element;
   fourth oscillating means provided by said position indicator, when said position indicator is set at a position on said tablet, said first to fourth oscillating means form an oscillating system, and when said oscillating system is placed in oscillating state, one of the magnetic field and electric field of said position indicator acts on said positional coordinate determining conductors, to determine a position on said tablet that is indicated by said position indicator; and
   an oscillation preventing conductor provided on said tablet to prevent erroneous formation of said oscillating system, said oscillation preventing conductor and a selected one of said plurality of conductor loops of said second oscillating means each being connected to a separate input of said amplifier forming said third oscillating means.

5. A cordless digitizer as claimed in claim 4, wherein said oscillation preventing conductor connected to said amplifier forming said third oscillating means is arranged substantially along said first oscillating means arranged in the periphery of said tablet.

6. A cordless digitizer as claimed in claim 4, wherein said oscillation preventing conductor connected to said amplifier forming said third oscillating means comprises a conductor loop arranged at the end of the group of said second oscillating means.

7. A cordless digitizer as claimed in claim 4, wherein, from among said plurality of conductor loops forming said second oscillating means, two conductor loops are connected, as said second oscillating means and said oscillation preventing conductor, to the separate inputs of said amplifier of said third oscillating means, wherein said amplifier is a differential amplifier.

* * * * *